(12) United States Patent
Hasegawa

(10) Patent No.: US 9,172,846 B2
(45) Date of Patent: Oct. 27, 2015

(54) SCANNING DEVICE AND OPERATIONS THEREOF

(71) Applicant: BROTHER KOGYO KABUSHIKI KAISHA, Nagoya-shi, Aichi-ken (JP)

(72) Inventor: Wataru Hasegawa, Nagoya (JP)

(73) Assignee: BROTHER KOGYO KABUSHIKI KAISHA, Nagoya-Shi, Aichi-Ken (JP)

( * ) Notice: Subject to any disclaimer, the term of this patent is extended or adjusted under 35 U.S.C. 154(b) by 0 days.

(21) Appl. No.: 14/500,017

(22) Filed: Sep. 29, 2014

(65) Prior Publication Data

US 2015/0092224 A1  Apr. 2, 2015

(30) Foreign Application Priority Data

Sep. 30, 2013  (JP) ................................. 2013-204121

(51) Int. Cl.
 *H04N 1/44* (2006.01)
 *H04N 1/00* (2006.01)

(52) U.S. Cl.
 CPC ......... *H04N 1/4446* (2013.01); *H04N 1/00856* (2013.01); *H04N 2201/0081* (2013.01)

(58) Field of Classification Search
 USPC ....................... 358/1.13, 1.14, 1.15, 1.16, 474
 See application file for complete search history.

(56) References Cited

U.S. PATENT DOCUMENTS

| | | | |
|---|---|---|---|
| 6,075,623 A * | 6/2000 | Yun ............................... | 358/486 |
| 8,269,993 B2 * | 9/2012 | Takatani et al. .............. | 358/1.13 |
| 8,988,698 B2 * | 3/2015 | Akahira et al. .............. | 358/1.14 |
| 2001/0009615 A1 * | 7/2001 | Yokobori et al. .............. | 399/45 |
| 2004/0170443 A1 | 9/2004 | Maeshima | |
| 2010/0238458 A1 * | 9/2010 | Sakuda et al. ................. | 358/1.2 |

FOREIGN PATENT DOCUMENTS

| | | |
|---|---|---|
| JP | 2002-232639 A | 8/2002 |
| JP | 2004-266408 A | 9/2004 |

\* cited by examiner

*Primary Examiner* — Allen H Nguyen
(74) *Attorney, Agent, or Firm* — Merchant & Gould PC

(57) ABSTRACT

A scanning device includes: a reading unit; a communication unit; a storage unit configured to store identification information for identifying a external apparatus; an operation unit, and a controller configured to perform operations comprising: generating an image file from read signal received from the reading unit, transmitting the image file generated to the external apparatus through the communication unit, and determining whether a size of the document on which the image read by the reading unit is recorded is equal to or smaller than a preset setting size. When the controller receives a signal corresponding to a scan command from the operation unit, the controller, in the generating, generates an image file having a password added, in a case where it is determined that a size of the document is equal to or smaller than the setting size.

11 Claims, 8 Drawing Sheets

SCANNING DEVICE AND OPERATIONS THEREOF

CROSS-REFERENCE TO RELATED APPLICATION

This application claims priority from Japanese Patent Application No. 2013-204121 filed on Sep. 30, 2013, the entire subject matter of which is incorporated herein by reference.

TECHNICAL FIELD

This disclosure relates to a scanning device capable of performing communication with an external apparatus, operations thereof, and a computer-readable program.

BACKGROUND

There is a technology for reading a document by a scanning device and transmitting an image file, which is a file including image data generated by the reading of the document, to an external apparatus through a network.

SUMMARY

However, the technology disclosed in background art has a following problem. Specifically, in a case where a document having much personal information described thereon, such as a credit card, a license card, a name card, a membership card and the like, is scanned by the scanning device, if an image file of the document having the personal information described thereon is erroneously transmitted to an unintended external apparatus, the personal information may be leaked.

This disclosure is to provide at least a technology capable of reducing a risk of leak of personal information when an image file is erroneously transmitted.

A scanning device in one illustrative aspect of this disclosure includes: a reading unit configured to read an image described on a document and to output a read signal; a communication unit capable of performing communication with an external apparatus; a storage unit configured to store identification information for identifying the external apparatus; an operation unit configured to output a signal corresponding to a operation, and a controller. The controller is configured to perform operations including: generating an image file, which is a file comprising image data, from the read signal received from the reading unit, transmitting the image file generated by the generating to the external apparatus through the communication unit, and determining whether a size of the document on which the image read by the reading unit is recorded is equal to or smaller than a preset setting size. When the controller receives a signal corresponding to a scan command from the operation unit: the controller, in the generating, generates an image file having a password added thereto based on the read signal output from the reading unit, in a case where it is determined that a size of the document is equal to or smaller than the setting size; and the controller, in the transmitting, transmits the image file generated by the generating, to the external apparatus identified by the identification information stored in the storage unit.

A scanning device in another aspect of this disclosure includes: a reading unit configured to read an image described on a document and to output a read signal; a communication unit capable of performing communication with an external apparatus; a storage unit configured to store identification information for identifying the external apparatus; an operation unit configured to output a signal corresponding to a operation, and a controller. The controller is configured to perform operations including: generating an image file, which is a file comprising image data, from the read signal received from the reading unit, transmitting the image file generated by the generating to the external apparatus through the communication unit, and determining whether a size of the document on which the image read by the reading unit is recorded is equal to or smaller than a preset setting size. When the controller receives a signal corresponding to a scan command from the operation unit: the controller, in the generating, generates an image file having a password added thereto based on the read signal output from the reading unit, if a preset setting condition is not satisfied, in a case where if it is determined that a size of the document is equal to or smaller than the setting size; and the controller, in the transmitting, transmits the image file generated by the generating, to the external apparatus identified by the identification information stored in the storage unit.

A non-transitory computer-readable medium in another aspect of this disclosure has instructions to control a computer of a scanner device. The scanner includes a reading unit configured to read an image described on a document and to output a read signal, a communication unit capable of performing communication with an external apparatus, a storage unit configured to store identification information for identifying the external apparatus and an operation unit configured to output a signal corresponding to an input thereon. The instructions, when executed by the computer, control the computer to perform operations including generating an image file, which is a file comprising image data, from the read signal received from the reading unit, transmitting the image file generated by the generating to the external apparatus through the communication unit, and determining whether a size of the document on which the image read by the reading unit is recorded is equal to or smaller than a preset setting size. When the computer receives a signal corresponding to a scan command from the operation unit: the computer, in the generating, generates an image file having a password added thereto based on the read signal output from the reading unit, in a case where it is determined that a size of the document is equal to or smaller than the setting size; and the computer, in the transmitting, transmits the image file generated by the generating, to the external apparatus identified by the identification information.

A non-transitory computer-readable medium in another aspect of this disclosure has instructions to control a computer of a scanner device. The scanner includes a reading unit configured to read an image described on a document and to output a read signal, a communication unit capable of performing communication with an external apparatus, a storage unit configured to store identification information for identifying the external apparatus and an operation unit configured to output a signal corresponding to an input thereon. The instructions, when executed by the computer, control the computer to perform operations including: generating an image file, which is a file comprising image data, from the read signal received from the reading unit, transmitting the image file generated by the generating to the external apparatus through the communication unit, and determining whether a size of the document on which the image read by the reading unit is recorded is equal to or smaller than a preset setting size. When the computer receives a signal corresponding to a scan command from the operation unit: the computer, in the generating, generates an image file having a password added thereto based on the read signal output from the reading unit, if a preset setting condition is not satisfied, in a case where it is determined that a size of the document is equal to or smaller than the setting size; and the computer, in the transmitting, transmits the image file generated by the generating, to the external apparatus identified by the identification information.

According to the scanning device and program of this disclosure, in a case where a document size to be read is a setting size or smaller, an image file having a password added thereto is generated and transmitted to the external apparatus. Since most of the documents on which much personal information is described, such as a credit card, a license card, a name card, a membership card and the like, have a card size, when the setting size is set as the card size, a password is set in an image file of the credit card, the license card and the like. Thereby, even when the image file of the credit card, the license card and the like is erroneously transmitted, it is possible to reduce a risk of leak of the personal information.

Also, when the preset condition is satisfied, an image file having no password can be generated. Specifically, when transmitting an image file to an external apparatus having high reliability, for example, an external apparatus to which an image file has been transmitted several times, even though the document size to be read is the setting size or smaller, an image file having no password is generated. Thereby, it is possible to see an image based on image data included in the image file without using a password with the external apparatus having high reliability, which is convenient.

BRIEF DESCRIPTION OF THE DRAWINGS

The foregoing and additional features and characteristics of this disclosure will become more apparent from the following detailed descriptions considered with the reference to the accompanying drawings, wherein.

DETAILED DESCRIPTION

<Configuration of Communication System>

Figure 1:
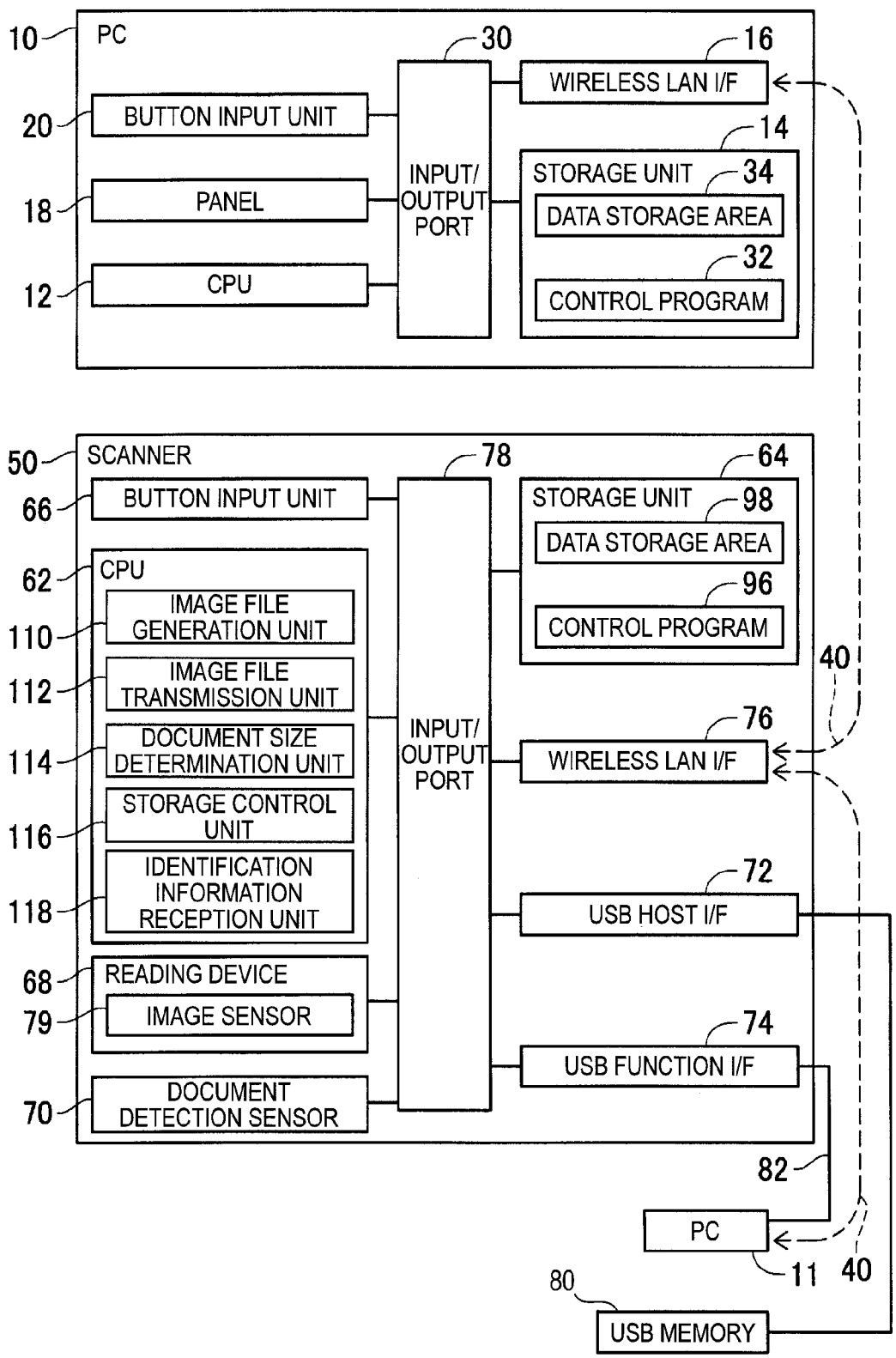
FIG. 1 is a block diagram of a communication system.

FIG. 1 is a block diagram of a communication system 1 exemplified as an illustrative embodiment of this disclosure. The communication system 1 includes a PC (an abbreviated term of Personal Computer) (an example of the external apparatus of this disclosure) 10, a PC (an example of the external apparatus of this disclosure) 11, and a scanner (an example of the scanning device of this disclosure) 50. The PCs 10, 11 and the scanner 50 have a well-known function as a wireless LAN terminal apparatus.

Since the PC 10 and the PC 11 have the same configuration, a configuration of the PC 10 is representatively described. The PC 10 is mainly provided with a CPU (an abbreviated term of Central Processing Unit) 12, a storage unit 14, a wireless LAN I/F 16, a panel 18 and a button input unit 20. The components are configured to perform communication with each other through an input/output port 30.

The wireless LAN I/F 16 is configured to perform wireless communication (data communication using a radio wave) 40 based on an infrastructure mode of a wireless LAN type (a mode with which a plurality of wireless LAN terminal apparatuses performs data communication through an access point). That is, the PC 10 accesses an access point of the scanner 50 and can directly perform data communication with the scanner 50 when the wireless communication 40 of a wireless LAN type is enabled.

The CPU 12 is configured to execute processing, in response to a control program 32 stored in the storage unit 14. The control program 32 is a program for performing data communication with the scanner 50. In the meantime, the storage unit 14 is configured by a combination of a RAM (an abbreviated term of Random Access Memory), a ROM (an abbreviated term of Read Only Memory), a flash memory, an HDD (an abbreviated term of Hard Disk Drive), a buffer of the CPU 12 and the like. Also, the storage unit 14 is provided with a data storage area 34. The data storage area 34 is an area configured to store therein an image file and the like.

The button input unit 24 consists of a keyboard and is configured to receive a button operation of a user. The panel 18 is configured to display an image, which is acquired using the data communication and the like, a character, which is input through the button input unit 24, and the like.

Figure 2:
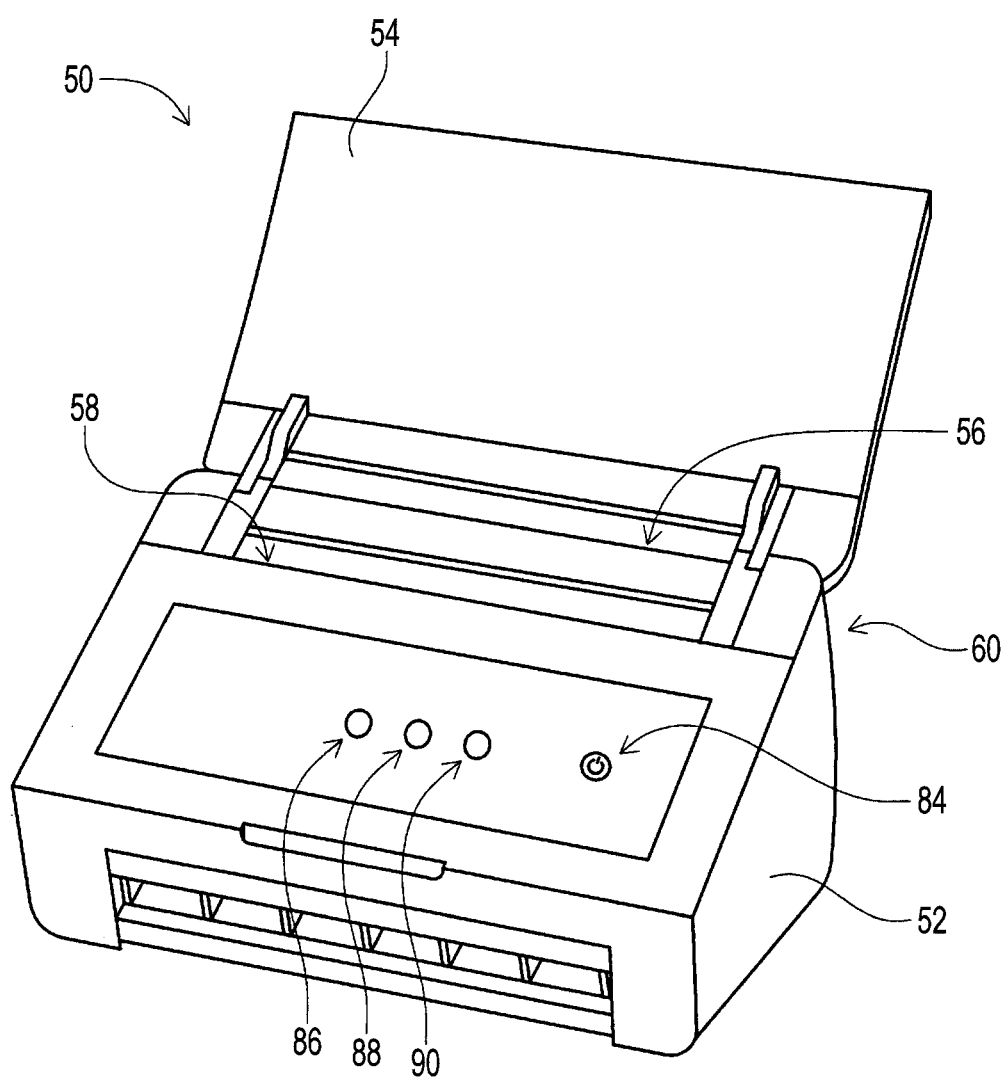
FIG. 2 is a perspective view of a scanner.

As shown in FIG. 2, the scanner 50 is configured by a scanner main body 52 and a cover 54. The cover 54 is openably and closably provided on an upper surface of the scanner main body 52. FIG. 2 is a perspective view showing the scanner 50 of which the cover 54 is opened.

The scanner 50 is an apparatus configured to generate scan data by reading a document. The scanner 50 is provided with a document platen 56 on an upper surface of the scanner main body 52. The document platen 56 is exposed at a state where the cover 54 is opened. A document set on the document platen 56 is inserted into the scanner main body 52 through a first insertion opening 58 (an example of the first conveyance path of this disclosure) and an image thereof is read, so that scan data is prepared. In the meantime, a readable maximum size of the document to be inserted through the first insertion opening 58 is an A4 size.

Also, the scanner 50 is provided with a second insertion opening (an example of the second conveyance path of this disclosure) 60 different from the first insertion opening 58. The second insertion opening 60 is provided on a backside of the scanner main body 52. A document can be inserted into the second insertion opening 60 at a state where the cover 54 is closed. In the meantime, a readable maximum size of the document to be inserted through the second insertion opening 60 is a name card size. That is, a document having a name card size or smaller can be inserted through the second insertion opening 60 and can be thus read. Also, even when the document that is inserted through the second insertion opening 60 is made of a relatively rigid material, it can be read. Specifically, a credit card, a license card and the like formed of plastic and the like can be read.

As shown in FIG. 1, the scanner 50 is mainly provided with a CPU (an example of the controller and the computer of this disclosure) 62, a storage unit (an example of the storage unit of this disclosure) 64, a button input unit (an example of the operation unit of this disclosure) 66, a reading device (an example of the reading unit of this disclosure) 68, a document detection sensor 70, a USB host I/F 72, a USB function I/F 74 and a wireless LAN I/F (an example of the communication unit of this disclosure) 76. The components are configured to perform communication with each other through an input/output port 78.

The reading device 68 is provided with an image sensor (an example of the reading element of this disclosure) 79. The document inserted through the first insertion opening 58 and the document inserted through the second insertion opening 60 are conveyed via a facing area of the image sensor 79. The image sensor 79 is configured to read an image of the facing area and to output an analog read signal. The analog read signal is converted into a digital format by an AD converter (not shown) and becomes image data. In the meantime, the CPU 62 is configured to appropriately convert the image data and to add a header area thereto, thereby preparing an image file including the image data. Also, the document detection sensor 70 is provided in the second insertion opening 60 and configured to detect whether a document is inserted in the second insertion opening 60.

The USB host I/F 72 and the USB function I/F 74 are interfaces of a USB standard. A USB memory 80 can be detachably mounted to the USB host I/F 72. That is, when the USB memory 80 is mounted to the USB host I/F 72, the prepared image file can be stored in the USB memory 80. In the meantime, the USB memory can be used for another recording medium such as a hard disk drive inasmuch as the medium has an interface of a USB standard. The USB function I/F 74 is connected to the PC 11 through a USB cable 82. Thereby, the scanner 50 can perform communication with the PC 11 through the USB cable 82. The wireless LAN I/F 68 is configured to perform wireless communication 40 with the PC 10 and the PC 11, based on the infrastructure mode of the wireless LAN type. Thereby, the scanner 50 can perform data communication with the PC 10 and the PC 11 through the wireless communication 40.

The button input unit 66 is to operate the scanner 50, and has a main power supply switch 84 and three selection buttons (an example of the operation button of this disclosure) 86, 88, 90, as shown in FIG. 2. The main power supply switch 84 is a switch for switching on and off states of a power supply of the scanner 50. The three selection buttons are buttons for selecting a transmission destination of the image file.

The CPU 62 is configured to execute processing, in response to a control program (an example of the program of this disclosure) 96 in the storage unit 64. The control program 96 is a program for executing scan processing. In the meantime, the storage unit 64 is configured by a combination of a RAM, a ROM, a flash memory, an HDD, a buffer of the CPU 62 and the like. Also, the storage unit 64 is provided with a data storage area 98. The data storage area 98 is an area configured to store therein image data output from the reading device 68, an image file prepared on the basis of the image data, data necessary to execute the control program 96 and the like.

<Scan Processing by Scanner>

Figure 3:
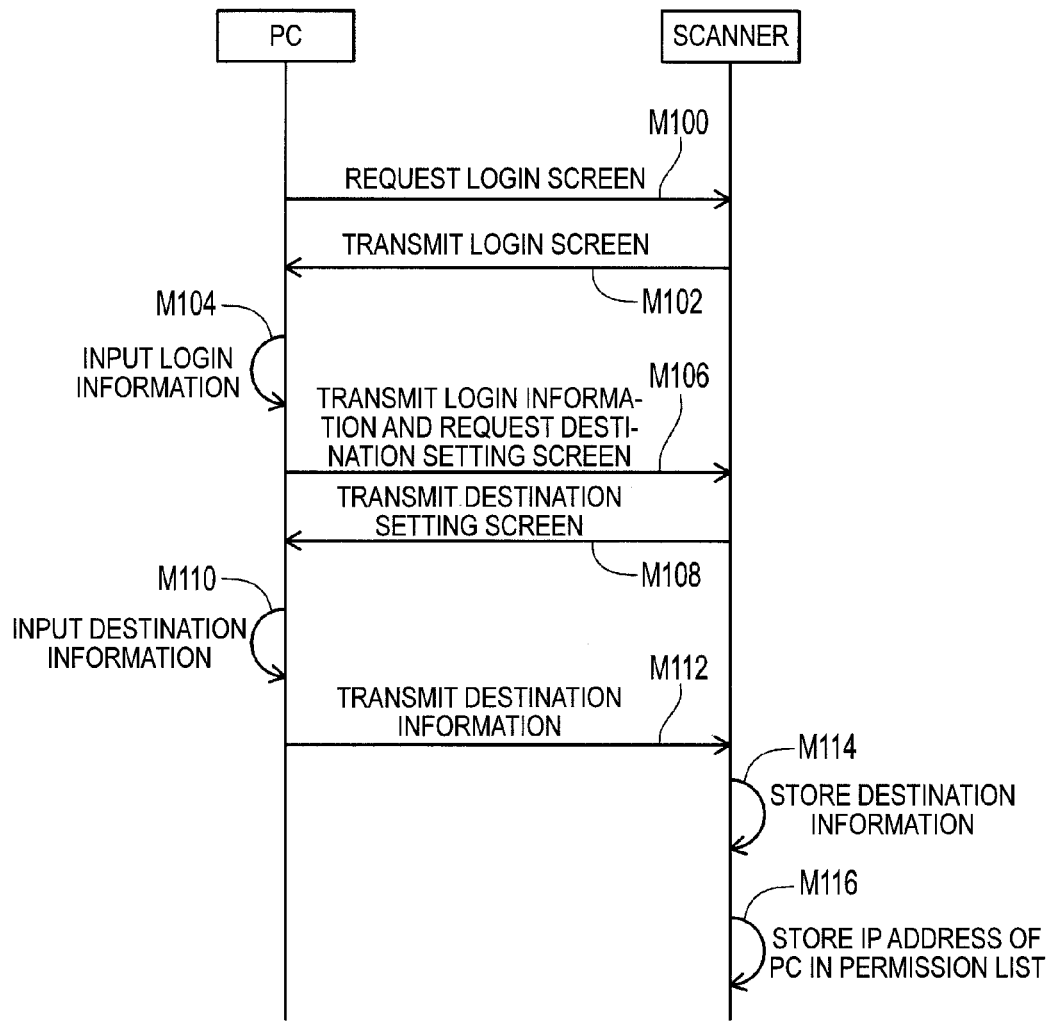
FIG. 3 is a sequence diagram when setting a transmission destination of a selection button of the scanner.

In the communication system 1, a transmission destination of an image file, which is transmitted by operating the selection buttons 86, 88, 90 of the scanner 50, is set by the PC 10. In the below, a method of setting the transmission destination of the selection buttons 86, 88, 90 by the PC 10 is specifically described with reference to a sequence diagram shown in FIG. 3.

First, the PC 10 transmits a request, which instructs the scanner 50 to transmit screen data of a screen (hereinafter, also referred to as 'login screen') for inputting information necessary to log in the scanner 50 to the PC 10, to the scanner 50 through the wireless communication 40 (M100). The scanner 50 transmits the screen data of the login screen to the PC 10 through the wireless communication 40, as a reply to the request for transmission of the screen data of the login screen (M102).

Figure 4:
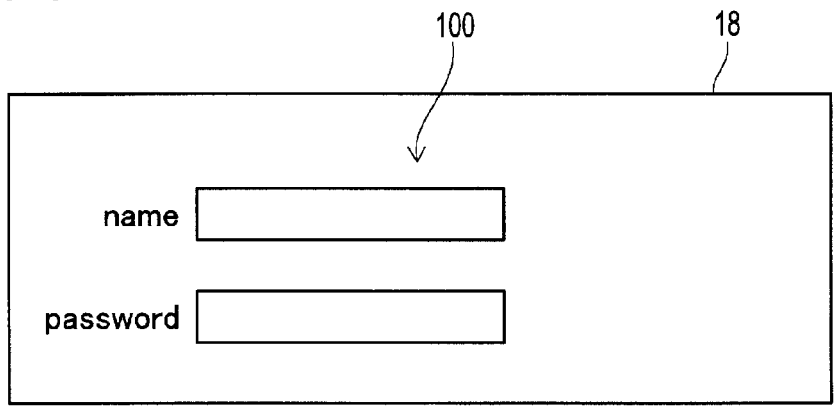
FIG. 4 illustrates a login screen.

When the PC 10 receives the screen data of the login screen, the PC 10 displays an image based on the screen data, specifically a login screen 100 shown in FIG. 4 on the panel 18. When the login screen 100 is displayed on the panel 18, a user inputs login information, specifically, a user name and a password (M104). When the login information is input, the PC 10 transmits the login information to the scanner 50 through the wireless communication 40 and transmits a request, which instructs the scanner 50 to transmit screen data of a screen (hereinafter, also referred to as a 'destination setting screen') for setting a transmission destination of the image file to be transmitted by an operation of the selection buttons 86, 88, 90 to the PC 10, to the scanner 50 through the wireless communication 40 (M106).

Figure 5:
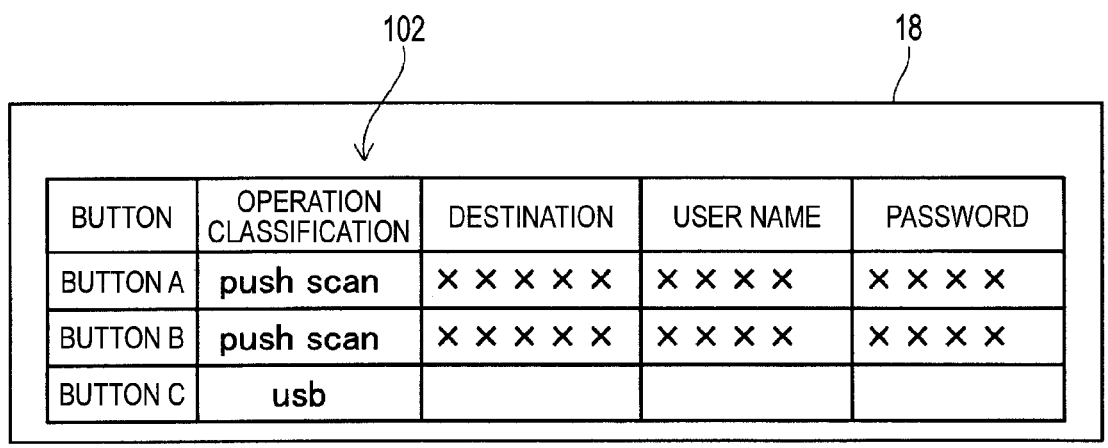
FIG. 5 illustrates a destination setting screen.

The scanner 50 transmits the screen data of the destination setting screen to the PC 10 through the wireless communication 40, as a reply to the request for transmission of the screen data of the destination setting screen (M108). When the PC 10 receives the screen data of the destination setting screen, the PC 10 displays a screen based on the screen data, specifically, a destination setting screen 102 shown in FIG. 5 on the panel 18. In the destination setting screen 102, input columns of 'operation classification', 'destination', 'use name' and 'password' are displayed in correspondence to the respective selection buttons 86, 88, 90. Meanwhile, in the destination setting screen 102, a button A indicates the selection button 86, a button B indicates the selection button 88 and a button C indicates the selection button 90, respectively.

In the input column of 'operation classification', 'push scan' or 'usb' is input. When 'push scan' is input in the input column of 'operation classification', scan processing (hereinafter, also referred to as 'push scan processing') of transmitting an image file to an external apparatus such as the PC 10 set in correspondence to the operated selection button is executed on condition where the selection button is operated. That is, when the selection button 86 or selection button 88 is operated, the push scan processing is executed. Also, when 'usb' is input in the input column of 'operation classification', scan processing (hereinafter, also referred to as 'USB scan processing') of transmitting an image file to the USB memory 80 or an external apparatus connected to the USB cable 82, i.e., the PC 11 is executed on condition where the selection button is operated. That is, when the selection button 90 is operated, the USB scan processing is executed.

In the input column of 'destination', information for identifying a transmission destination of an image file upon the push scan processing, specifically an IP address (an example of the identification information of this disclosure) is input. Meanwhile, in the input of 'destination' corresponding to the button A, an IP address of the PC 10 is input, and in the input of 'destination' corresponding to the button B, an IP address of the PC 11 is input. That is, when the selection button 86 is operated, the image file is transmitted to the PC 10 by the execution of the push scan processing, and when the selection button 88 is operated, the image file is transmitted to the PC 11 by the execution of the push scan processing. Also, since the button C is the selection button 90 for executing the USB scan processing, the input column of 'destination' corresponding to the button C is empty.

In the input columns of 'user name' and 'password', information, which is necessary when performing data communication with a transmission destination of an image file upon the push scan processing, is input. That is, in the input columns of 'user name' and 'password' corresponding to the button A, the information that is necessary when performing data communication with the PC 10 is input, and in the input columns of 'user name' and 'password' corresponding to the button B, the information that is necessary when performing data communication with the PC 11 is input. In the meantime, since the button C is the selection button 90 for executing the USB scan processing, the input columns of 'user name' and 'password' corresponding to the button C are empty.

When the input of the various information on the destination setting screen 102 is completed, the PC 10 transmits the information (hereinafter, also referred to as 'destination information') input on the destination setting screen 102 to the scanner 50 through the wireless communication 40 (M112). When the scanner 50 receives the destination information, the scanner 50 stores the destination information in the data storage area 98 (M114). Further, the scanner 50 adds the IP address of the PC 10 to a permission list stored in the data storage area 98 (M116). In the meantime, the permission list will be specifically described later.

When the transmission destination of the image file, which is to be transmitted by the operation of the selection buttons 86, 88, 90 of the scanner 50, is set by the PC 10 and any one of the selection buttons 86, 88, 90 is operated by the user, the scan processing corresponding to the selected button is executed. Specifically, when any one of the selection buttons 86, 88, 90 is operated, the document is read by the reading device 68 and the digital data, which is obtained by AD converting the analog read signal, is stored in the data storage area 98 of the storage unit 64. The CPU 62 generates an image file, based on the digital data (i.e., image data) stored in the data storage area 98. Then, the CPU 62 transmits the image file to the transmission destination corresponding to the selection buttons 86, 88, 90. That is, when the selection button 86 is operated, the image file is transmitted to the PC 10, when the selection button 88 is operated, the image file is transmitted to the PC 11, and when the selection button 90 is selected, the image file is transmitted to the USB memory 80 or the PC 11 through the USB cable 82.

As described above, just when the selection buttons 86, 88, 90 of the scanner 50 are operated, the document is read and the image file, which is generated by the reading of the document, can be transmitted to any PC 10, 11 or the USB memory 80. Thus, the operability is improved. However, since the scanner 50 is not provided with a display apparatus such as a panel, the image file may be transmitted to an unintended transmission destination of the user.

For example, a scanner having a display apparatus can display the information, which indicates that an image file is to be transmitted to the PC 10 by an operation of the selection button 86, on the display apparatus, and the user can check the corresponding information and operate any one of the selection buttons 86, 88, 90. However, since the scanner 50 is not provided with a display apparatus, the user operates any one of the selection buttons 86, 88, 90 on the basis of a memory of the user. For this reason, a selection button, not the selection button corresponding to the original transmission destination, may be operated due to a wrong memory of the user, so that an image file may be transmitted to an unintended transmission destination. That is, for example, the user may operate the selection button 88 with a mind of transmitting an image file to the PC 10, so that the image file may be erroneously transmitted to the PC 11. In particular, as described above, since the scanner 50 can read an image of a credit card, a license card and the like, when the image file is erroneously transmitted, the information having high confidentiality such as the credit card and the license card may be leaked.

With considering the above situation, according to the scanner 50, when scanning a document having a possibility that the information having high confidentiality may be included, a password is added to an image file. On the other hand, for a transmission destination having high reliability, even an image file of a document having a possibility that the information having high confidentiality may be included is transmitted without adding a password. Specifically, as described above, a document having a size equal to or smaller than a name card size is inserted through the second insertion opening 60 and even the plastic document can be read. That is, there is a high possibility that the information having high confidentiality will be included in the document inserted through the second insertion opening 60. For this reason, a password is added to an image file of the document inserted through the second insertion opening 60. In the meantime, the document detection sensor 70 determines whether the document is inserted through the second insertion opening 60.

Also, the configuration of adding a password to an image file is to set the image file so that a password is required when opening the image file and printing an image including the image file. More specifically, the password is set in a header area of the image file. In this illustrative embodiment, the image file has a PDF format, and an input of a password is required when opening the file and performing a printing on the basis of the image data included in the file. If a password can be set, a file format is not necessarily a PDF format.

When the image file is transmitted to the USB memory 80 or the PC 11 through the USB cable 82, i.e., when performing the USB scan processing, the user mounts the USB memory 80 to the USB host I/F 72 or connects the USB cable 82 connected to the USB function I/F 74 to the PC 11. Therefore, there is little concern that the information having high confidentiality will be leaked to another person, even though the image file is erroneously transmitted to the USB memory 80 or the PC 11 through the USB cable 82. For this reason, when performing the USB scan processing, a password is not added to an image file of a document inserted through the second insertion opening 60.

Also, the transmission destination of the image file, which is to be transmitted by the operation of the selection buttons 86, 88, 90 of the scanner 50, is typically set by the user of the scanner 50. That is, there is a high possibility that the user of the scanner 50 is using the external apparatus, specifically the PC 10 having set the transmission destination of the selection buttons 86, 88, 90. Therefore, for example, even when the user of the scanner 50 erroneously operates the selection button 86 with a mind of transmitting the image file to the PC 11, the image file is transmitted to the PC 10 that is being used by the user of the scanner 50. That is, even when the image file is erroneously transmitted to the PC 10 upon the push scan processing, there is little concern that the information having high confidentiality is leaked to another person. Therefore, when the transmission destination of the image file is the external apparatus having set the transmission destination of the selection buttons 86, 88, 90 upon the push scan processing, a password is not added to the image file of the document inserted through the second insertion opening 60.

Meanwhile, upon the push scan processing, a process of determining whether the transmission destination of the image file is the external apparatus having set the transmission destination of the selection buttons 86, 88, 90 is performed on the basis of the permission list. Specifically, the permission list is stored in the data storage area 98. When the transmission destination of the selection buttons 86, 88, 90 is set, the IP address of the external apparatus, i.e., the PC 10 having set the transmission destination of the selection buttons 86, 88, 90 is added to the permission list, as described above. For this reason, when the document is inserted through the second insertion opening 60 and the push scan processing is executed, the IP address of the external apparatus of the transmission destination and the IP address of the permission list are compared. When the IP address of the external apparatus of the transmission destination and the IP address of the permission list coincide with each other, it is determined that the transmission destination of the image file is the external apparatus having set the transmission destination of the selection buttons 86, 88, 90, and a password is not added to the image file of the document inserted through the second insertion opening 60.

Also, it is presumed that the external apparatus to which the image file is transmitted several times upon the scan processing is being used several times by the user of the scanner 50. Therefore, even when the image file is erroneously transmitted to the external apparatus, there is little concern that the information having high confidentiality will be leaked to another person. Thus, when the transmission destination of the image file is the external apparatus to which the image file is transmitted several times upon the scan processing, a password is not added to the image file of the document inserted through the second insertion opening 60.

Specifically, for example, since the PC 11 is not the external apparatus having set the transmission destination of the selection buttons 86, 88, 90, the IP address of the PC 11 is not included in the permission list. For this reason, when the selection button 88 is operated by the user and a target of the push scan processing is a document inserted through the second insertion opening 60, a password is added to an image file of the document. However, when the push scan processing is executed by the operation of the selection button 88 and the image file is transmitted to the PC 11 by the set number of times, the IP address of the PC 11 is added to the permission list. Thereby, when the transmission destination of the image file is the external apparatus to which the image file is transmitted several times upon the scan processing, a password is not added to the image file of the document inserted through the second insertion opening 60.

Figure 6:
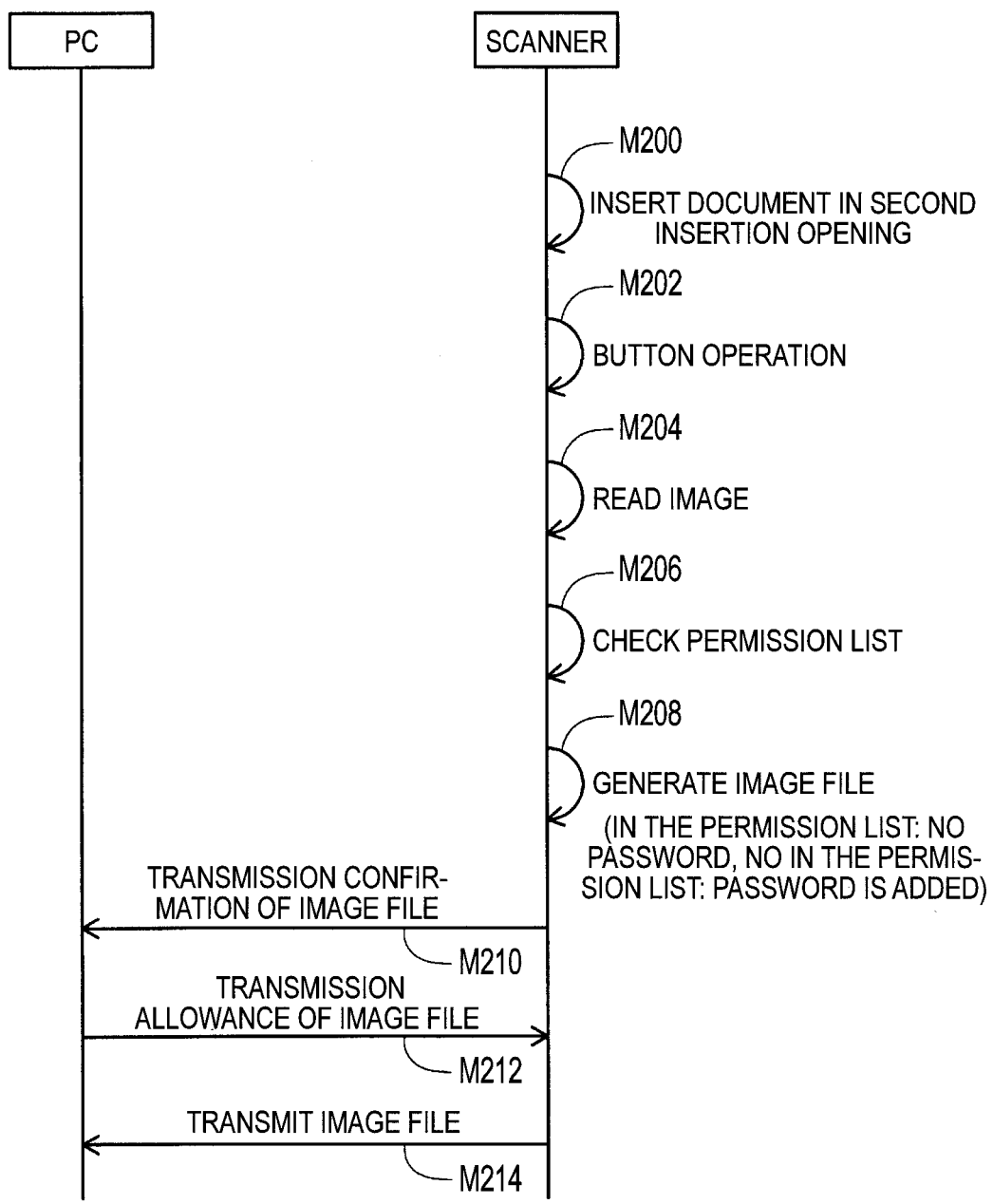
FIG. 6 is a sequence diagram when executing push scan processing.

In this way, the image file having the password added thereto or the image file having no password is generated. Then, the generated image file is transmitted to the external apparatus corresponding to the selection button operated by the user. In the below, the scan processing for a document having a possibility that the information having high confidentiality may be included is specifically described with reference to a sequence diagram shown in FIG. 6.

First, a document is inserted into the second insertion opening 60 of the scanner 50 (M200). Then, the user operates the selection button (M202). Subsequently, the document inserted into the second insertion opening 60 is read by the reading device 68 (M204). Then, the CPU 62 compares the IP address of the external apparatus corresponding to the operated selection button with the IP address of the permission list (M206).

When the IP address of the external apparatus corresponding to the operated selection button coincides with the IP address of the permission list, i.e., when the IP address of the external apparatus corresponding to the operated selection button is included in the permission list, an image file having no password added thereto is generated (M208). On the other hand, when the IP address of the external apparatus corresponding to the operated selection button does not coincide with the IP address of the permission list, i.e., when there is no IP address of the external apparatus corresponding to the operated selection button in the permission list, an image file having a password added thereto is generated (M208).

When the image file is generated, the scanner 50 transmits a confirmation, which indicates whether to transmit the image file to the PC 10 or PC 11, to the PC 10 or PC 11 through the wireless communication 40 (M210). The PC 10 or PC 11 transmits a response, which allows transmitting the image file to the PC 10 or PC 11, to the scanner 50 through the wireless communication 40, as a reply to the transmission confirmation of the image file (M212). Then, the scanner 50 transmits the image file to the PC 10 or PC 11 through the wireless communication 40, as a reply to the transmission allowance of the image file (M214).

Also, the scanner 50 can execute scan processing different from the push scan processing and the USB scan processing. Specifically, on condition where a command of scan processing is transmitted from the PC 10 and the like through the wireless communication 40, scan processing (hereinafter, also referred to as 'pull scan processing') of transmitting an image file to the PC 10 and the like having transmitted the command of scan processing is executed. In the pull scan processing, there is no user operation on the scanner 50 and a transmission destination of the image file is the external apparatus having transmitted the command of scan processing. That is, in the pull scan processing, since there is no concern that an image file is erroneously transmitted, a password is not added to an image file of a document inserted through the second insertion opening 60.

Also, the external apparatus that transmits a command of the pull scan processing to the scanner 50 is an apparatus that is used by the user of the scanner 50. That is, even when an image file is erroneously transmitted to the external apparatus having transmitted a command of the pull scan processing to the scanner 50, there is little concern that the information having high confidentiality will be leaked to another person. For this reason, an IP address of the external apparatus having transmitted a command of the pull scan processing to the scanner 50 is added to the permission list after the pull scan processing. Thereby, when a transmission destination of an image file is the external apparatus having once transmitted the command of the pull scan processing to the scanner 50, a password is not added to an image file of a document inserted through the second insertion opening 60.

Figure 7:
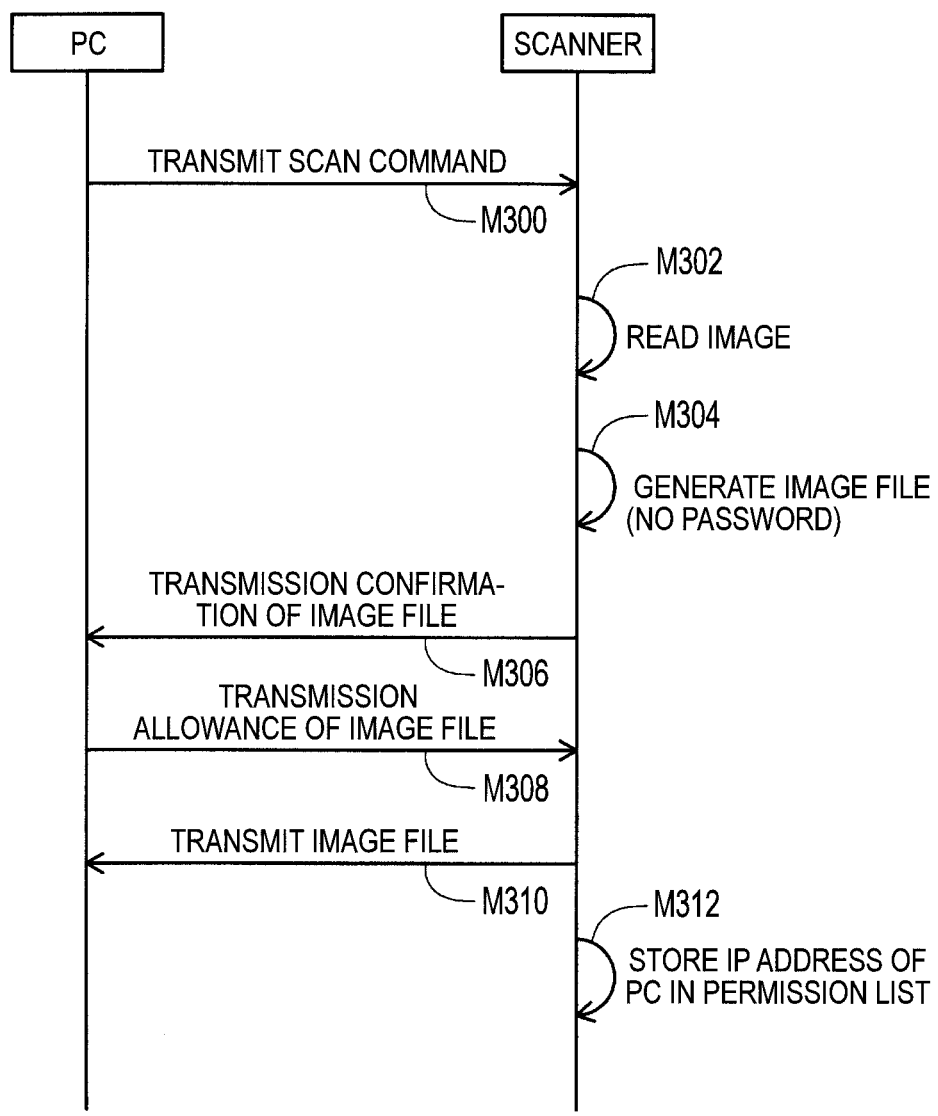
FIG. 7 is a sequence diagram when executing pull scan processing.

In the below, the pull scan processing is specifically described with reference to a sequence diagram shown in FIG. 7. First, the PC 10 or PC 11 transmits a command of the pull scan processing to the scanner 50 through the wireless communication 40 (M300). When the scanner 50 receives the command of the pull scan processing, a document is read by the reading device 68 (M302). Then, an image file having no password added thereto is generated (M304).

When the image file is generated, the scanner 50 transmits a confirmation, which indicates whether to transmit the image file to the PC 10 or PC 11, to the PC 10 or PC 11 through the wireless communication 40 (M306). The PC 10 or PC 11 transmits a response, which allows transmitting the image file to the PC 10 or PC 11, to the scanner 50 through the wireless communication 40, as a reply to the transmission confirmation of the image file (M308).

Then, the scanner 50 transmits the image file to the PC 10 or PC 11 through the wireless communication 40, as a reply to the transmission allowance of the image file (M310). Further, the scanner 50 adds the IP address of the PC 10 or PC 11 to the permission list stored in the data storage area 98 (M312).

<Control Program>

The push scan processing, the pull scan processing and the USB scan processing are executed as the control program 96 is executed in the CPU 62 of the scanner 50. In the below, a flow is described when the control program 96 is executed in the CPU 62 of the scanner 50 with reference to FIGS. 8 and 9.

In the control program 96, the CPU 62 determines whether a command of the pull scan processing is received from the external apparatus such as the PC 10 and the like (step (hereinafter, abbreviated to 'S') 100). When a command of the pull scan processing is not received from the external apparatus (NO in S100), the CPU 62 determines whether the selection buttons 86, 88, 90 are operated (S102). When the selection buttons 86, 88, 90 are not operated (NO in S102), the control program returns to S100.

On the other hand, when the selection buttons 86, 88, 90 are operated (YES in S102), the CPU 62 determines whether a transmission destination of an image file is a device connected by a local cable or the USB memory 80 (S104). That is, the CPU 62 determines whether to transmit an image file to the USB memory 80 or not or whether to transmit an image file to the PC 11 or not through the USB cable 82. When the image file is not transmitted to the USB memory 80 or the PC 11 through the USB cable 82 (NO in S104), the CPU 62 determines whether a document is inserted into the second insertion opening 60 (S106). That is, the CPU 62 determines whether a document is detected by the document detection sensor 70.

When a document is inserted into the second insertion opening 60 (YES in S106), the CPU 62 determines whether an IP address of a transmission destination is included in the permission list (S108). When there is no IP address of a transmission destination in the permission list (NO in S108), the document is read by the reading device 68 and an image file having a password is generated on the basis of a read signal (S112).

Then, 1 (one) is added to the number of transmission times C. Then, the CPU 62 determines whether the number of transmission times C is equal to or larger than the set number of times A (S116). When the number of transmission times C is equal to or larger than the set number of times A (YES in S116), an IP address of the PC of the transmission destination is registered in the permission list (S118). By the above processing, the control program 96 is over. On the other hand, when the number of transmission times C is smaller than the set number of times A (NO in S116), the processing of S118 is skipped over and the control program 96 is over.

Also, when a command of the pull scan processing is received from the external apparatus in S100 (YES in S100), an IP address of the apparatus having transmitted the command of the pull scan processing is registered in the permission list (S120). Continuously, the document is read by the reading device 68 and an image file having no password is generated on the basis of a read signal (S122). Then, the processing of S112 and thereafter is executed.

Also, when the image file is transmitted to the USB memory 80 or the PC 11 through the USB cable 82 (YES in S104), the document is read by the reading device 68 and an image file having no password is generated on the basis of a read signal (S122). Then, the processing of S112 and thereafter are executed.

Also, when a document is not inserted in the second insertion opening 60 in S106 (NO in S106), i.e., when a document is inserted in the first insertion opening 58, the document inserted through the first insertion opening 58 is read by the reading device 68 and an image file having no password is generated on the basis of a read signal (S122). Then, the processing of S112 and thereafter is executed.

Also, when an IP address of the transmission destination is included in the permission list in S108 (YES in S108), the document is read by the reading device 68 and an image file having no password is generated on the basis of a read signal (S122). Then, the processing of S112 and thereafter is executed.

<Functional Configuration of CPU>

It can be thought that the CPU 62 configured to execute the sequences and the control program 96 has the functional configurations as shown in FIG. 1, considering the execution processing thereof. As can be seen from FIG. 1, the CPU 62 is provided with an image file generation unit 110, an image file transmission unit 112, a document size determination unit 114, a storage control unit 116 and an identification information reception unit 118.

The image file generation unit 110 is a functional unit configured to execute the processing of S110 and S122 of the control program 96. The image file transmission unit 112 is a functional unit configured to execute the processing of S112 of the control program 96. The document size determination unit 114 is a functional unit configured to execute the processing of S106 of the control program 96. The storage control unit 116 is a functional unit configured to execute the processing of M116 of the sequence. The identification information reception unit 118 is a functional unit configured to execute the processing of M110 of the sequence.

Meanwhile, this disclosure is not limited to the above illustrative embodiment and can be implemented in various aspects in which the illustrative embodiment is variously changed and improved on the basis of a knowledge of one skilled in the art. Specifically, for example, in the above illustrative embodiment, the document detection sensor 70 is provided in the second insertion opening 60 into which a document having a name card size or smaller can be inserted. When a document is detected by the document detection sensor 70, it is determined that a size of the document is equal to or smaller than the name card size. However, it is possible to determine a size of a document by a variety of methods. For example, a document placed on a flat bed may be read, image data may be generated from a read signal and a size of the document can be determined on the basis of the image data.

Also, in the above illustrative embodiment, this disclosure is applied to the scanner 50 having no display apparatus such as panel. However, this disclosure can be also applied to a scanner having a display. This is because a user erroneously pushes a button to erroneously transmit an image file even though a display apparatus is provided.

Also, in the above illustrative embodiment, the image sensor 79 is provided on the conveyance path of the document inserted through the first insertion opening 58 and the conveyance path of the document inserted through the second insertion opening 60. However, image sensors may be respectively provided on the conveyance path of the document inserted through the first insertion opening 58 and the conveyance path of the document inserted through the second insertion opening 60. That is, it is possible to provide an image sensor for the conveyance path of the document inserted through the first insertion opening 58 and an image sensor for the conveyance path of the document inserted through the second insertion opening 60.

Figure 8:
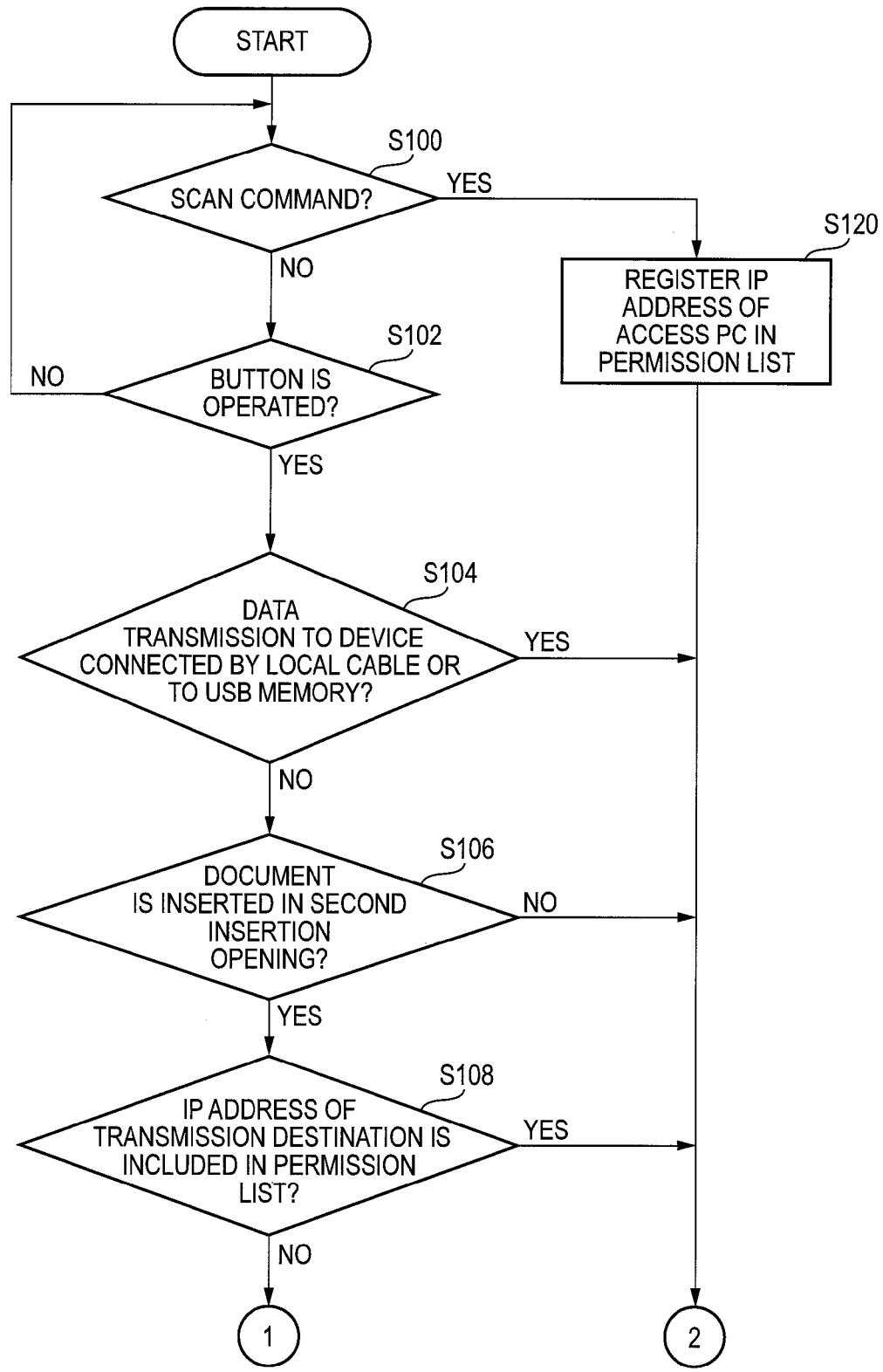
FIG. 8 is a flowchart showing operations of the scanner.
Figure 9:
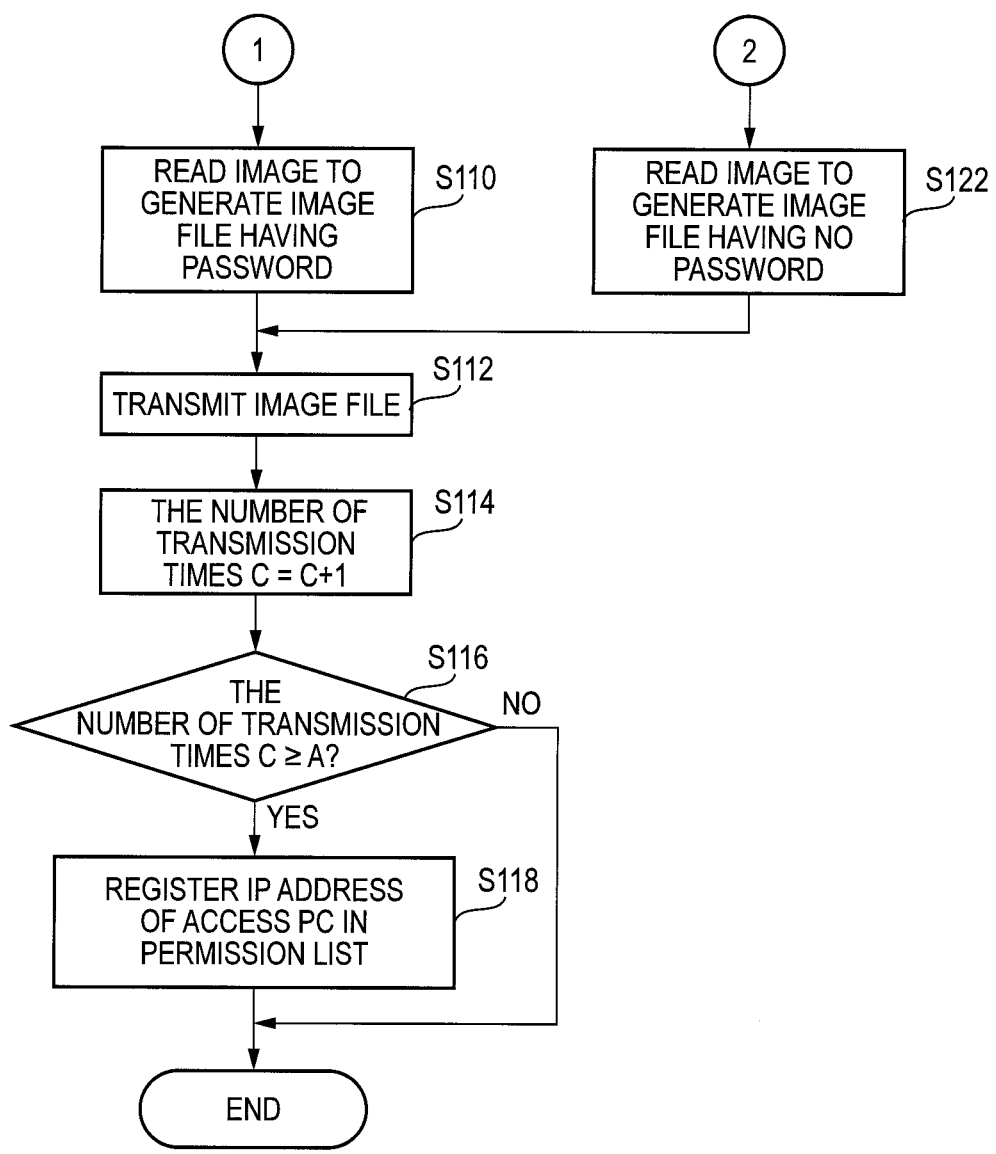
FIG. 9 is a flowchart showing operations of the scanner.

Also, in the above illustrative embodiment, the processing shown in FIGS. 8 and 9 is executed by the CPU 62. However, the processing may be executed by an ASIC or another logical integrated circuit, rather than the CPU 62, or may be executed by cooperation of the CPU 62, the ASIC and another logical integrated circuit.

What is claimed is:
1. A scanning device comprising:
   a reading unit configured to read an image described on a document and to output a read signal;
   a communication unit capable of performing communication with an external apparatus;

a storage unit configured to store identification information for identifying the external apparatus;

an operation unit configured to output a signal corresponding to an operation, and a controller configured to perform operations comprising:

generating an image file, which is a file comprising image data, from the read signal received from the reading unit, transmitting the image file generated by the generating to the external apparatus through the communication unit, and determining whether a size of the document on which the image read by the reading unit is recorded is equal to or smaller than a preset setting size, and wherein when the controller receives a signal corresponding to a scan command from the operation unit:

the controller, in the generating, generates an image file having a password added thereto based on the read signal output from the reading unit, in a case where it is determined that a size of the document is equal to or smaller than the setting size; and the controller, in the transmitting, transmits the image file generated by the generating, to the external apparatus identified by the identification information stored in the storage unit.

2. The scanning device according to claim 1, further comprising:

a first conveyance path configured to convey a document larger than the setting size via a facing area of an image sensor of the reading unit; and a second conveyance path configured to convey a document equal to or smaller than the setting size via the facing area of the reading element, wherein the controller, in the determining, determines that a size of the document is equal to or smaller than the setting size when the document is conveyed through the second conveyance path.

3. The scanning device according to claim 1, wherein the operation unit comprises a plurality of operation buttons configured to output a detection signal indicating that an input medium comes close to or is contacted, wherein the storage unit is configured to store therein a plurality of identification information for identifying each of a plurality of the external apparatuses and to associate and store therein the plurality of operation buttons and the plurality of identification information, and wherein when the controller receives the detection signal from any one of the plurality of operation buttons, the image file transmission unit transmits the image file to an external apparatus identified by the identification information corresponding to the operation button that is an output source of the detection signal received by the controller.

4. The scanning device according to claim 1, wherein the scanning device is not provided with a display apparatus.

5. A scanning device comprising:

a reading unit configured to read an image described on a document and to output a read signal;

a communication unit capable of performing communication with an external apparatus;

a storage unit configured to store identification information for identifying the external apparatus;

an operation unit configured to output a signal corresponding to a an operation, and a controller configured to perform operations comprising:

generating an image file, which is a file comprising image data, from the read signal received from the reading unit, transmitting the image file generated by the generating to the external apparatus through the communication unit, and determining whether a size of the document on which the image read by the reading unit is recorded is equal to or smaller than a preset setting size, and wherein when the controller receives a signal corresponding to a scan command from the operation unit:

the controller, in the generating, generates an image file having a password added thereto based on the read signal output from the reading unit, if a preset setting condition is not satisfied, in a case where if it is determined that a size of the document is equal to or smaller than the setting size; and the controller, in the transmitting, transmits the image file generated by the generating, to the external apparatus identified by the identification information stored in the storage unit.

6. The scanning device according to claim 5, wherein the setting condition comprises a condition where an external apparatus as a transmission destination of the transmitting is an external apparatus to which an image file has been transmitted by the set number of times or larger by the transmitting.

7. The scanning device according to claim 5, wherein the identification information is to identify an external apparatus during the communication with the external apparatus through the communication unit, wherein the controller is configured to perform operations comprising:

receiving identification information about any external apparatus from the external apparatus through the communication unit; and storing the identification information received by the receiving in the storage unit, and wherein the setting condition comprises a condition where the identification information about an external apparatus as a transmission destination of the transmitting is identification information received, from the external apparatus identified by the identification information, by the receiving.

8. The scanning device according to claim 5, wherein when the controller receives a scan command from the external apparatus through the communication unit, the controller, in the generating, generates an image file having no password added thereto based on the read signal output from the reading unit even if the controller, in the determining, determines that the size of the document is equal to or smaller than the setting size and the setting condition is not satisfied.

9. The scanning device according to claim 8, wherein the setting condition comprises a condition where the controller had once received a scan command from an external apparatus as a transmission destination of the transmitting through the communication unit.

10. A non-transitory computer-readable medium having instructions to control a computer of a scanner device including a reading unit configured to read an image described on a document and to output a read signal, a communication unit capable of performing communication with an external apparatus, a storage unit configured to store identification information for identifying the external apparatus and an operation unit configured to output a signal corresponding to an input thereon, the instructions, when executed by the computer, control the computer to perform operations comprising:

generating an image file, which is a file comprising image data, from the read signal received from the reading unit, transmitting the image file generated by the generating to the external apparatus through the communication unit, and determining whether a size of the document on which the image read by the reading unit is recorded is equal to or smaller than a preset setting size, and wherein when the computer receives a signal corresponding to a scan command from the operation unit:

the computer, in the generating, generates an image file having a password added thereto based on the read signal output from the reading unit, in a case where it is determined that a size of the document is equal to or smaller than the setting size; and the computer, in the transmitting, transmits the image file generated by the generating, to the external apparatus identified by the identification information.

11. A non-transitory computer-readable medium having instructions to control a computer of a scanner device including a reading unit configured to read an image described on a document and to output a read signal, a communication unit capable of performing communication with an external apparatus, a storage unit configured to store identification information for identifying the external apparatus and an operation unit configured to output a signal corresponding to an input thereon, the instructions, when executed by the computer, control the computer to perform operations comprising:

generating an image file, which is a file comprising image data, from the read signal received from the reading unit, transmitting the image file generated by the generating to the external apparatus through the communication unit, and determining whether a size of the document on which the image read by the reading unit is recorded is equal to or smaller than a preset setting size, and wherein when the computer receives a signal corresponding to a scan command from the operation unit:

the computer, in the generating, generates an image file having a password added thereto based on the read signal output from the reading unit, if a preset setting condition is not satisfied, in a case where it is determined that a size of the document is equal to or smaller than the setting size; and the computer, in the transmitting, transmits the image file generated by the generating, to the external apparatus identified by the identification information.

\* \* \* \* \*